United States Patent [19]

Pouey

[11] Patent Number: 4,623,251
[45] Date of Patent: Nov. 18, 1986

[54] METHOD FOR FOCUSING SPHERICAL HOLOGRAPHIC DIFFRACTION GRATINGS WORKING BY REFLECTION, AND DISPERSIVE LENSES AND SPECTROMETERS APPLYING THIS METHOD

[75] Inventor: Michel Pouey, Viroflay, France

[73] Assignee: Centre National de la Recherche Scientifique, Paris, France

[21] Appl. No.: 517,418

[22] Filed: Jul. 26, 1983

[30] Foreign Application Priority Data

Jul. 28, 1982 [FR] France .................. 82 13205

[51] Int. Cl.$^4$ .................. G01J 3/18; G01J 3/36
[52] U.S. Cl. .................. 356/328; 350/1.1; 356/334
[58] Field of Search .................. 356/334, 328; 350/1.1

[56] References Cited

U.S. PATENT DOCUMENTS 3,973,850  8/1976  Pouey .
4,036,558  7/1977  Pouey .
4,241,999  12/1980  Pouey .................. 356/331

FOREIGN PATENT DOCUMENTS 2124119  9/1972  France .
2180574  11/1973  France .
2323132  4/1977  France .

Primary Examiner—Vincent P. McGraw
Attorney, Agent, or Firm—Burns, Doane, Swecker & Mathis

[57] ABSTRACT

The disclosure relates to dispersive lenses and spectrometers for performing a method of focusing holograms in which the hologram that is placed on a spherical surface plays an active part in the focusing. Contrary to focusing methods of the prior art wherein the focusing locus is determined as a function of the tangential object and image focal lines, the described invention determines the focusing locus as a function of the sagittal object and image focal lines. A stigmatic mounting (i.e. a perfect mounting to eliminate odd order abberations) results in the tangential and sagittal focal lines being identical. The description sets forth equations to cover all points in the focusing plane by suitable action of the phase variations generated by the hologram. The diffraction grating used is reflective and includes a fixed entrance slit and at least one fixed exit slit.

13 Claims, 15 Drawing Figures

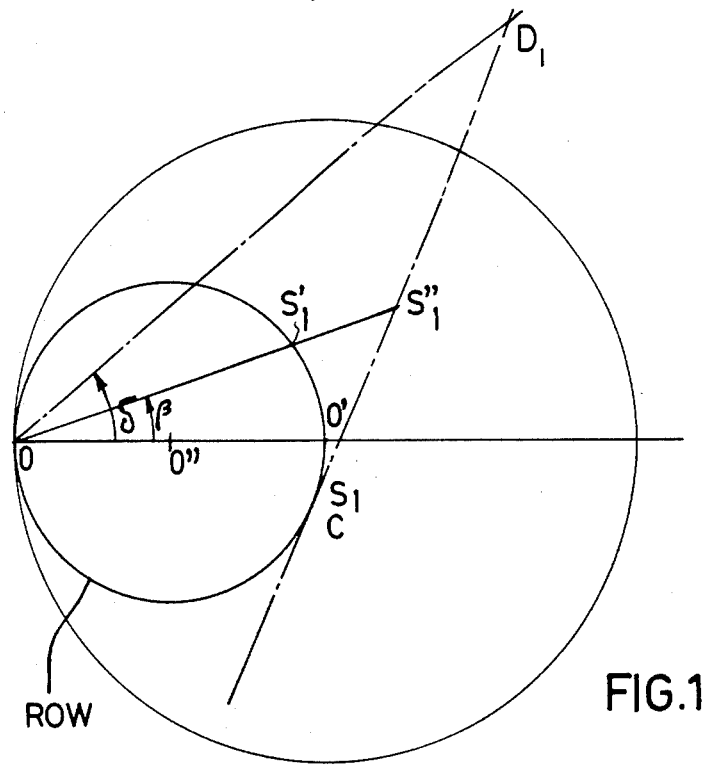
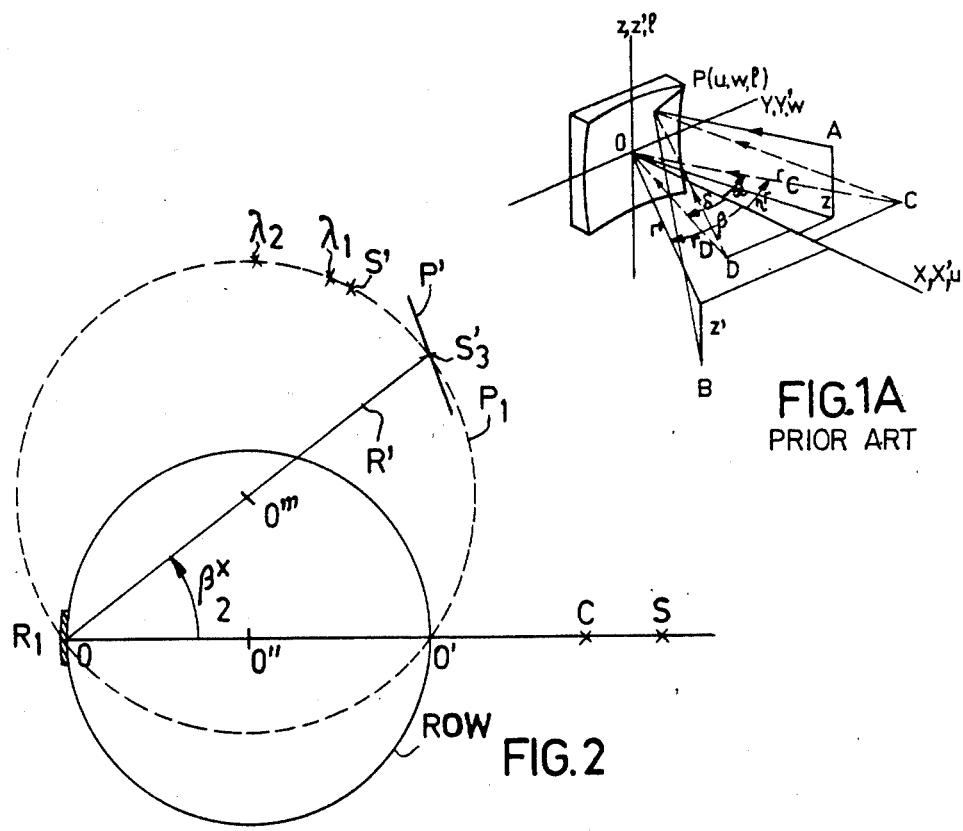
FIG.1 PRIOR ART
FIG.1A PRIOR ART
FIG.2

$\alpha = \delta + \theta$
$\beta = \delta - \theta$

METHOD FOR FOCUSING SPHERICAL HOLOGRAPHIC DIFFRACTION GRATINGS WORKING BY REFLECTION, AND DISPERSIVE LENSES AND SPECTROMETERS APPLYING THIS METHOD

The present invention relates to a method for focusing spherical holographic diffraction gratings working by reflection, for dispersing the different radiations making up a polychromatic light. The invention also relates to dispersive lenses and spectrometers using the method.

The spectrometers according to the present invention are spectrometers in which the dispersion and focusing of the polychromatic incident radiations are performed by a single optical element, namely a concave (or convex) grating.

The following are used in the present invention:

a real or virtual fixed entrance slit for the grating (in this case, the entrance slit is focused in the virtual space of the grating by means of a toroidal mirror working at its stigmatic points, that is to say with a magnification of one);

a fixed grating of radius of curvature R and ruled width W (ruled height L), having n lines/mm and produced by the holographic method; and at least one exit slit or a detector consisting, for example, of a set of mutually parallel, equidistant microchannels arranged over a curved surface.

The present invention is not concerned with the methods of recording the hologram, but to a focusing method in which a hologram placed on a spherical surface plays an active part in the focusing, and therefore relates also to the spatial localization of the recording points:

$C(\eta, \rho_c = R/r_c)$ and $D(\delta, \rho_D = R/r_D)$ positioned relative to the top of the grating in polar coordinates.

The present invention relates in particular to spectrometers intended for studying the profiles of the lines, that is to say those for which the pulsed response is symmetrical, this being an essential condition for easy application of the conventional methods of deconvolution.

It is known that if the spectrometer were perfectly corrected for aberrations, the pulsed response would be a function of the type $$\left(\frac{\sin x}{x}\right)^2$$

characterizing the diffraction by a rectangular pupil (so-called stigmatic mounting).

The 4th order aberrations (generalized spherical aberration) only cause a symmetrical broadening; on the other hand, the astigmatism curvature and the coma terms produce an asymmetrical broadening which must be made zero or negligible (the tolerances will then be deduced from the known image quality criteria).

In the prior art, a spectrometer is known which works with a fixed entrance slit, a fixed grating and a fixed detector, all the elements of which are on a circle of diameter ROW, called a Rowland circle [cf. J. A. R. Sampson, Techniques of Vacuum Ultraviolet Spectroscopy (Wiley, N.Y., 1967)]. However, all the mountings on the Rowland circle do not satisfy the requisite quality criterion.

Furthermore, it is known that a holographic grating with a non-uniform line distribution can give stigmatic images (cf. French Pat. No. 70/27,186 and its Certificate of Addition No. 73/28,625), that is to say images corrected for all the aberrations, if the recording points and the object and image points are harmonic conjugates relative to the circle of radius ROW, the center of which is the center of curvature of the grating.

The harmonicity ratio depends on the recording wavelength $\lambda_o$. At present, this solution cannot always be applied in the far ultraviolet (high value of the ratio $\lambda_o/\lambda$).

According to the theoretical and practical teachings of the prior art relating to spherical diffraction gratings, the focusing locus is determined as a function of the position of the tangential object and image focal lines.

All spectroscopic devices are derived from this universally acknowledged concept.

The present invention deviates radically from this concept and, quite unexpectedly, in contrast to the teachings of the prior art, it considers both a method and devices in which the focusing locus is determined as a function of the position of the sagittal object and image focal lines.

As far as is known, an embodiment of this type, which is in contrast to the generally acknowledged technique and which makes it possible to obtain images whose quality is limited only by diffraction, has never been carried out hitherto.

As already indicated, to obtain stigmatic images, the prior art envisaged displacing the sagittal focal line towards the tangential focal line. The surface (spherical or toroidal) and a line distribution (uniform or non-uniform) was therefore chosen in order to obtain an image corrected for the aberrations in the plane of the tangential focal line.

With a technique of this type, it is not possible to control the correction of the odd order aberrations so that they remain less than the wavelength; in other words, it is not possible to obtain images whose quality is limited by diffraction at any wavelength or in a broad spectral range.

In the prior art, it was proposed that the deformations of the incident spherical wave surface is the object space should be compensated by those resulting in the image space from the position of the image point.

This type of solution involves numerous disadvantages and numerous limitations. For instance, the embodiments do not cover the whole plane and do not make it possible to obtain stigmatism at very short wavelengths (less than 100 nanometers), the stigmatism wavelengths always being proportional to the recording wavelength of the hologram, which at present is 487.9 nanometers.

Those skilled in the art know that the tangential or sagittal focal line concepts involve an aberrational mounting (that is to say a mounting with defects).

The novel intuition according to the present invention consisted in assuming that it is possible to have a perfect mounting eliminating the odd order aberrations. Thus, there is no need to deduce the position of the top of the grating, the object and the images only from the general equation for the tangential focal line. If the mounting is stigmatic, the tangential and sagittal focal lines are identical and the new expression for focusing must then make it possible to cover all the points in the plane by suitable action of the phase variations generated by the hologram. This new expression for focusing is based, in the present invention, on the literal expression for the sagittal focus line, matched with a specific condition regarding the recording points of the hologram. The even order aberrations are then either zero or negligible in terms of Strehl's criterion.

To solve this problem, the present invention consists of dissociating the object space and the image space. In this case, the spherical incident wave surface remains spherical in the object space after interaction with the grating and likewise remains spherical in the image space.

It is important to point out that, although the devices of the invention can be used, from the spectral point of view, at any wavelength $\lambda$, the embodiments described herein will relate more particularly to the near and far ultraviolet, that is to say wavelengths less than 300 nm (nanometers).

The invention therefore proposes a method for focusing spherical holographic diffraction gratings of radius of curvature R, working by reflection, for dispersing the different radiations making up a polychromatic light. A fixed entrance slit and at least one fixed exit slit (or a multichannel detector) are used. The holographic grating is adjusted so that for a wavelength $\lambda$ and a diffraction order m such that $mn\lambda = \sin \alpha + \sin \beta$, and for any object distance $r = Re$ (e being the object distance divided by the value of the radius of curvature R of the grating) and any angle of incidence $\alpha$, the image distance $r' = Re$ (e' being the image distance divided by the radius of curvature R of the grating) is determined, for the angle of diffraction $\beta$, by the relationship:

$$\frac{1}{e} = \cos\alpha + \frac{1}{e'} - \cos\beta + \left(\frac{\sin\alpha + \sin\beta}{n\lambda_o}\right)(k_2 - k'_2) = 0$$

in which $k_2 - k'_2 = \rho_c = \cos \eta - \rho_D + \cos \delta$, corresponds to the sum of the sagittal object and image equations. Relationship n represents the number of lines per mm of the holographic grating produced at the laser wavelength $\lambda_o$ from the recording of interference fringes generated by two source points C and D, respectively defined by their polar coordinates, relative to the top of the grating, as follows:

for the point $C \begin{cases} r_c = R/\rho_c \text{ and} \\ \eta \end{cases}$ for the point $D \begin{cases} r_D = R/\rho_D \\ \delta \end{cases}$, and such that $$\rho_c \sin\eta = \frac{\sin\alpha}{e} = V; \rho_D \sin\delta = \frac{\sin\beta}{e'} = V',$$

V and V' being constants which can be equal to one another, the intensity distribution of the resulting diffracted image is symmetrical.

The present invention also relates to a dispersive lens corrected for the astigmatism and the comas. The source and one of the recording points are on the normal to the grating having $n = \sin \delta/\lambda_o$ lines/mm; $\lambda_o$ being the recording wavelength of the hologram. The recording point is at a distance $r_c$ from the top of the grating of radius of curvature R and the source point is at a distance r such that $$\frac{1}{r} = \frac{1 + P}{R} - \frac{P}{r_c}.$$

The locus of the images diffracted at the angle $\beta$ is such that, if m is the diffraction order, then $\sin \beta = mn\lambda$, $$P = \frac{m\lambda}{\lambda_o},$$

and a circle of radius $R/2 \sin \delta = R/2 \cos \beta_o$ is centered on the diffracted ray corresponding to the direction $\sin \beta_o = \cos \delta$, and passing through the top of the grating and its center of curvature. The second recording point is defined in polar coordinates by $r_D$ and $\delta$ such that $\sin \delta = n\lambda_o$ and $$r_D = \frac{r'\lambda_o}{m\lambda},$$

r' being the image distance characterized by any distance from the top of the grating to the abovementioned circle.

The present invention also provides a dispersive lens of the above type in which the recording point located on the normal to the grating is at a distance $$r_c = \frac{r\lambda_o}{\lambda m}$$

from the top of the grating of radius of curvature R, and the source point is located at a distance $$r = R\left(1 - \frac{m\lambda}{\lambda_o}\right)$$

from the top of the grating.

The present invention also provides a dispersive lens for which the locus of the object points is a circle of radius $R/[2|\sin \eta|] = R/(2 \cos \alpha_o)$ centered in the direction $\pm\sin \alpha_o = \cos \eta$ and passing through the top of the grating and its center of curvature, with $\alpha$ being the angle of incidence. Any one of the object points is at a distance $r = Re$ from the top of the grating, such that $r = R[\sin \alpha \cot g \eta + \cos \alpha]$. The recording point C is defined in polar coordinates by $\eta$ and its distance $r_c$ from the top of the grating, such that $r_c = -r/P$, with $P = m\lambda/\lambda_o$, m being the diffraction order and $\lambda_o$ being the recording wavelength of the hologram such that $\sin \alpha = -P \sin \eta$. The locus of the images diffracted at the angle $\beta$, with $\sin \beta = P \sin \delta$. A circle of radius $R/(2 \sin \delta) = R/(2 \cos \beta_o)$ is centered on the diffracted ray corresponding to the direction $\sin \beta_o = \cos \delta$, and passing through the top of the grating and its center of curvature. Any one of the image points is at a distance $r' = Re'$ from the top of the grating, such that $n' = R[\sin \beta \cot n \delta + \cos \beta]$. The second recording point is defined by $P \sin \delta = \sin \beta$ and by its distance $r_D$ from the top of the grating, such that $r_D = r'/P$.

The present invention also proposes a stigmatic polychromator that works in the positive order for the wavelengths $$\lambda^x - \Delta\lambda < \lambda^x < \lambda^x + \Delta\lambda,$$

in which the direction of the diffracted ray corresponding to the wavelength $\lambda^x$ is given by the formula: $mn\lambda^x = \sin \beta^x = \cos \delta = 0.6077$, and in which the focusing locus is a plane forming an angle of about 73.8° with the direction of the diffracted ray, and the image distance for the wavelength $\lambda^x$ has the value $r' = R \cos \beta^{x-1} = R \sin \delta^{-1} \simeq 1.26 R$ ($\alpha = \eta = 0$).

The present invention also relates to a stigmatic polychromator that works in the negative orders for the wvelengths $$\lambda^x - \Delta\lambda < \lambda^x < \lambda^x + \Delta\lambda,$$

in which the direction of the diffracted ray corresponding to the wavelength $\lambda^x$ is given by the formula $mn\lambda^x = \sin \beta^x$, with $\tan \beta^x = -\sin \delta(\sin \delta + \cos \delta)$, and with $\delta > 45°$, $\alpha = \eta = 0$. The focusing locus is a circle centered on the center of the Rowland circle and of radius $$R_c = \frac{R}{2} \left( \frac{\sin \delta + \cos \delta}{\sin \delta} \right).$$

The present invention also proposes a stigmatic dispersive lens for the far ultraviolet, that works in the negative orders. The object is located on the normal to the grating. The direction of observation corresponds to an angle of diffraction $\beta$ of less than 45°. One of the recording points is located on the normal to the grating and the second is located in the direction $\delta$ such that $\delta + \beta = \epsilon$, where $\epsilon$ is a positive quantity which is very small compared with $\delta$ and $\beta$.

The present invention also relates to a dispersive collimator in which the object is located at infinity on the normal to the grating. The observation wavelength $\lambda$ corresponds to the diffraction angle $\beta$ such that: $\sin \beta = P \sin \delta$. The object with $P = m\lambda/\lambda_o$, is observed on the circle of radius $R/(2 \sin \delta)$. One of the recording points C is located on the normal to the grating at a distance $r_c = RP/(P+1)$.

In the stigmatic polychromator of the invention, the source point and the image point are located on a circle whose radius is centered on the tangent to the top of the grating, and which passes through the top of the grating. The grating is a holographic grating such that, if $\lambda_o$ is the wavelength of the laser used for recording and n is the number of lines per mm, such that $n\lambda_o = \sin \delta - \sin \eta$, then the hologram is produced from two source points C ($\eta$, $r_c$) and D($\delta$, $r_D$), the position of which is defined in polar coordinates, and is such that $r_c = aR \sin \eta$ and $r_D = aR \sin \delta$; where a is a positive number which can be any integer or fraction greater than 0, and aR being the radius of the circle centered on the tangent to the top of the grating.

In one embodiment of the stigmatic polychromator of the present invention a toroidal mirror, working at a magnification of 1, gives an image of the source point. The image is located on the above mentioned circle whose radius is centered on the tangent to the top of the grating. The image passes through the top of the grating, with said image acting as a virtual object for the grating, thus giving a stigmatic real image located on the said circle.

The present invention also proposes a dispersive lens in which, for a beam coming from infinity at an angle $\alpha$ such that $\sin \alpha = P \sin \delta$, with $P = m\lambda/\lambda_o$, m being the interference order and $\lambda_o$ being the recording wavelength of the hologram, the diffracted image forms at the center of curvature of the grating. The recording points of the hologram, C[$\eta$, $r_c = \infty$] and D[$\delta$, $r_D = \square$] are angularly positioned, relative to the normal to the grating, so that $\delta + \eta = 2\alpha + \pi$.

The present invention also relates to a dispersive lens in which, for an incident beam coming from infinity at an angle $\alpha$ such that $\sin \alpha = P \sin \delta$, with $P = m\lambda/\lambda_o$, m being the interference order and $\lambda_o$ being the recording wavelength, the image forms at a distance $r' = R \sin \delta[\sin \delta + \sin (\delta - \alpha)]^{-1}$. One of the recording points, C, is at the center of curvature and the other, D, is at infinity, inclined at an angle $\delta$ relative to the normal to the grating.

The present invention also proposes a telecentric dispersive lens in which, for an incident beam coming from infinity at an angle $\alpha$ and a beam diffracted to infinity at an angle $\beta$, the angle between the said beams at the top of the said lens is $\alpha - \beta = 2\theta$, such that $m\lambda = 2\lambda_o \cos \theta$, m being the diffraction order and $\lambda_o$ being the recording wavelength of the hologram. One of the source points (C) is at the center of curvature of the said lens and the other (D) is at infinity, inclined at an angle $\delta$ relative to the normal to the said lens, this angle being equal to that formed by the normal to the lens and the bisector of the angle $2\theta$.

Various advantages and characteristics of the invention will become apparent from the detailed description below, which refers to the attached drawings.

A BRIEF DESCRIPTION OF THE DRAWINGS

FIG. 1 illustrates spectrometer mountings according to the prior art;

FIG. 1A illustrates the optical arrangement of a prior art grating;

Figure 3:
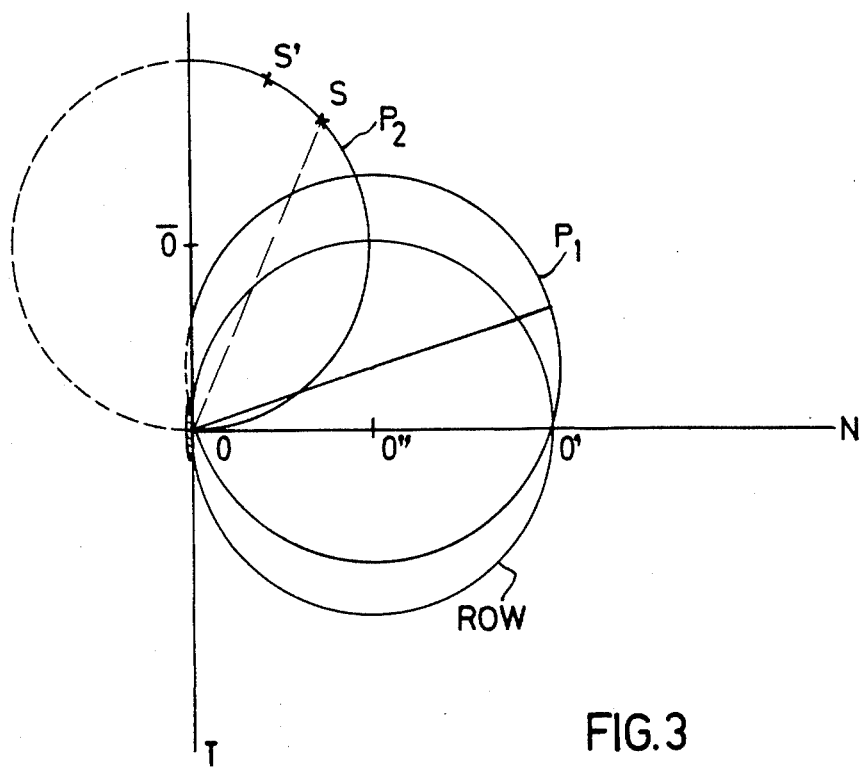
Figure 4:
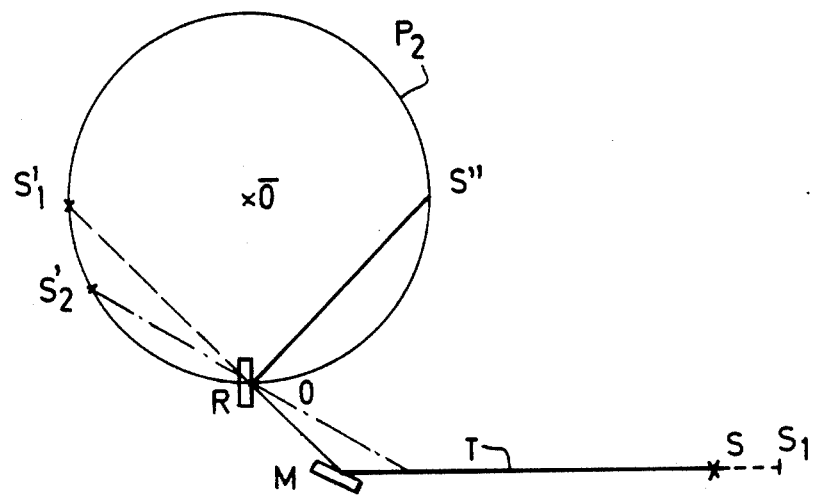
Figure 5:
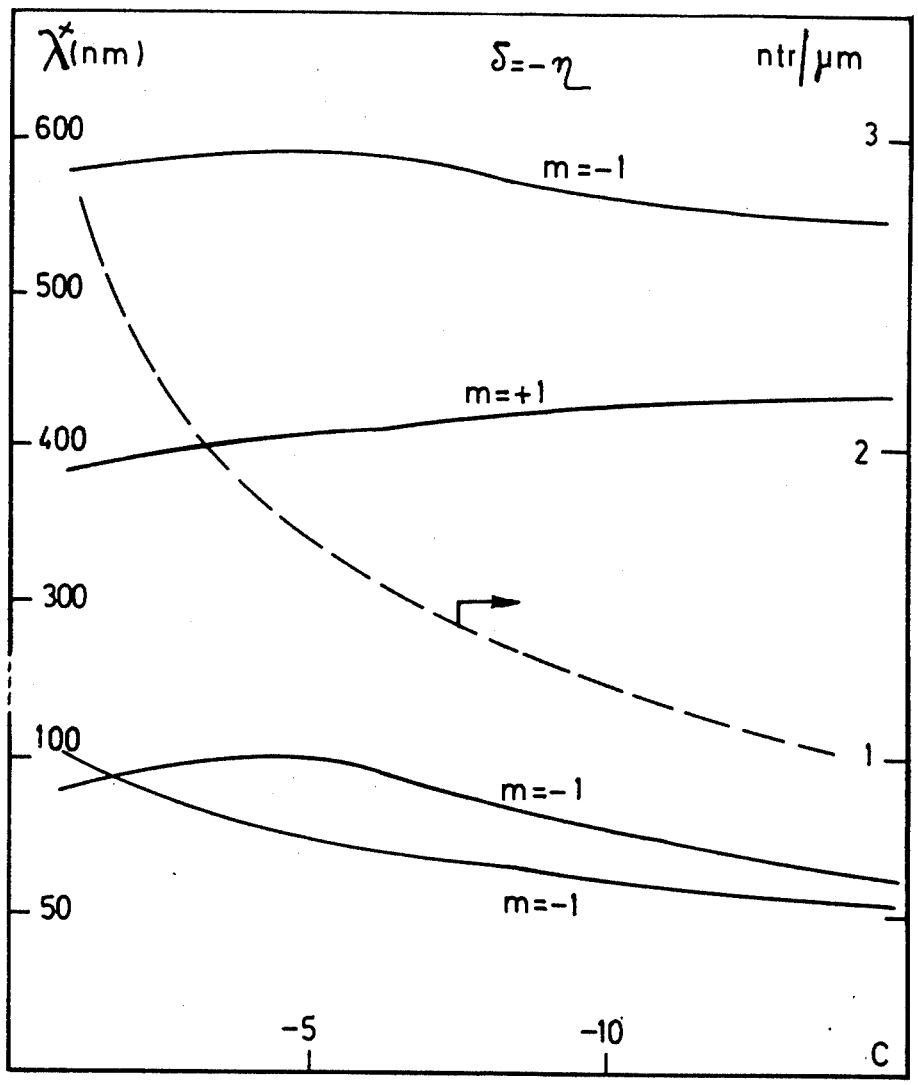
Figures 6A, 6B:
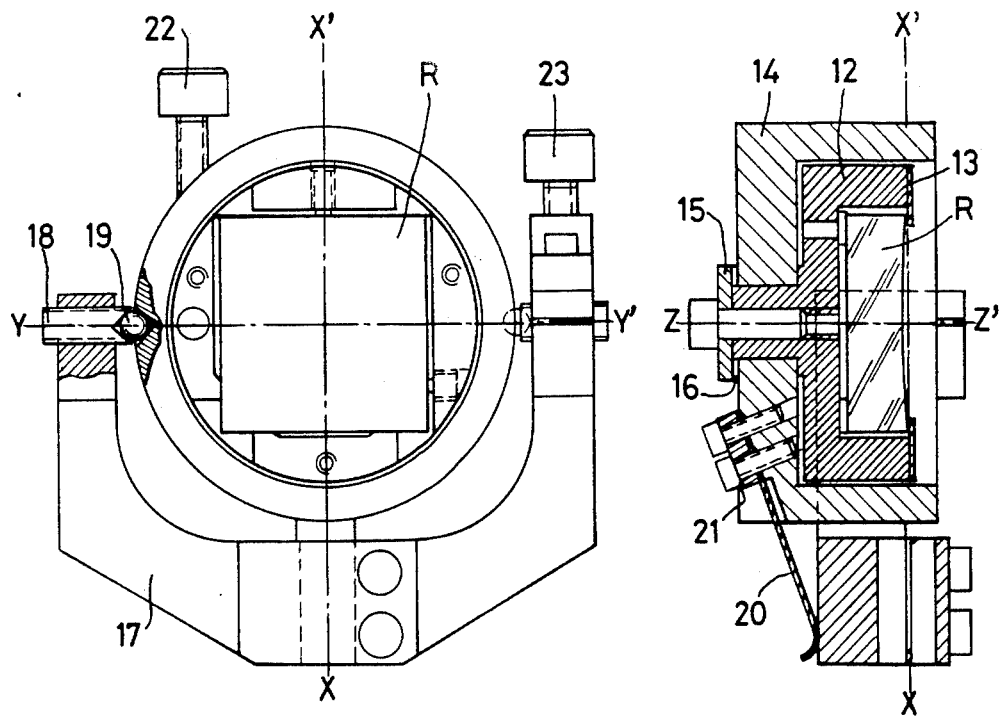
Figure 6C:
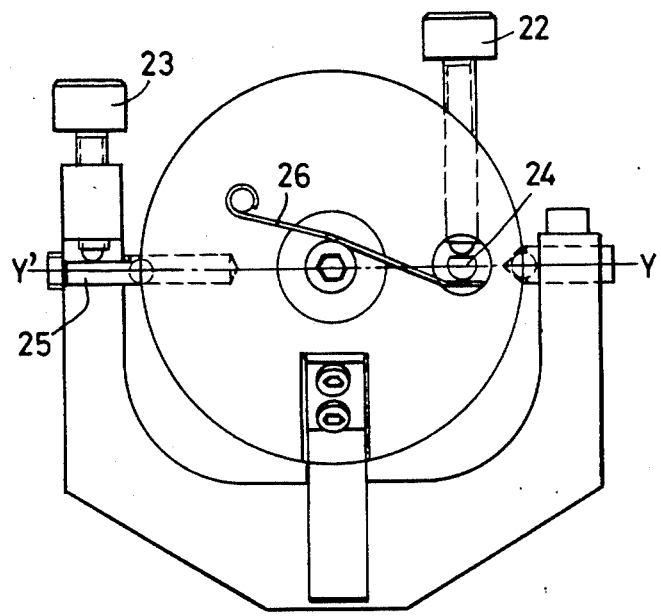
Figure 7A:
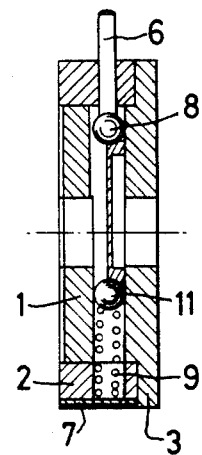
Figure 7B:
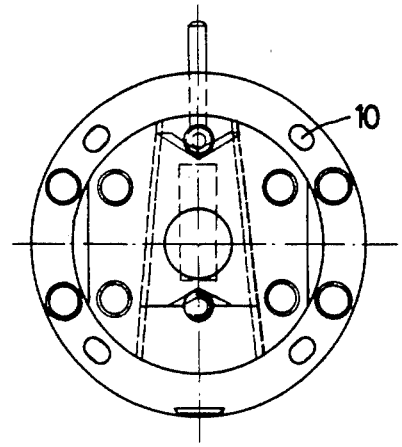
Figure 7C:
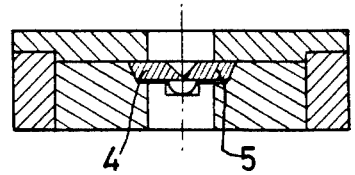
Figure 8:
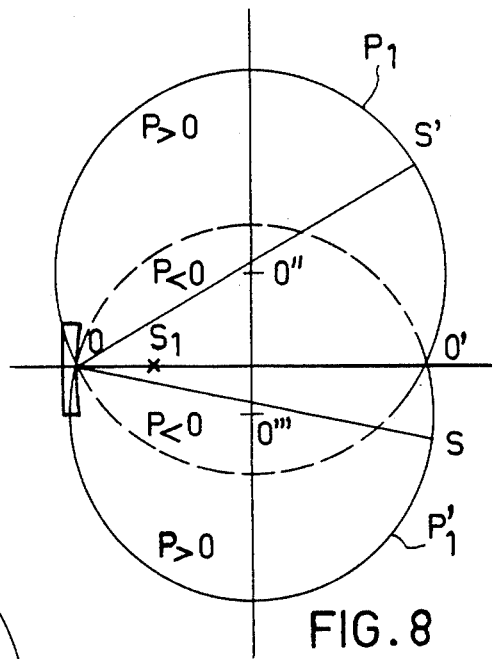
Figure 9:
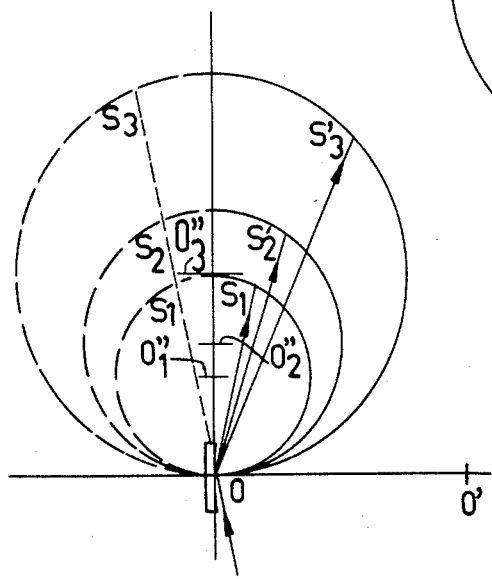
Figure 10:
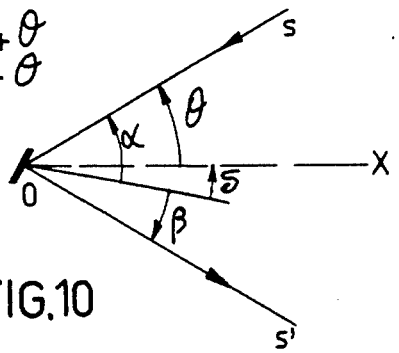

FIG. 2 shows the focusing locus of the images S' (circle $P_1$) corrected for the astigmatism and the coma for a source point S located on the normal to the grating $R_1$. One of the recording points C of the hologram also is on the normal to the grating $R_1$. ROW is the Rowland circle (locus of the tangential focal lines). FIG. 2 further shows wavelengths $\lambda_1$ and $\lambda_2$ on the circle in broken lines;

FIG. 3 shows the focusing locus (circle $P_2$) of the images corrected for the astigmatism and coma for several wavelengths obtained with a single grating;

FIG. 4 is a variant of FIG. 3;

FIG. 5 shows the stigmatism wavelengths obtained in the mountings according to FIGS. 3 and 4 as a function of a parameter characterizing the hologram;

FIGS. 6A, 6B and 6C illustrate a grating support with independent adjustment parameters;

FIGS. 7A, 7B and 7C illustrate, in section, a slit with a symmetrical aperture;

FIG. 8 shows the locus of the object points located at a finite distance for obtaining a strictly stigmatic image;

FIG. 9 shows the various circles for obtaining an image whose quality is limited only by the 4th order aberrations; and FIG. 10 illustrates an arrangement for a object and an image at infinity.

DETAILED DESCRIPTION OF THE INVENTION

The article by Michel POUEY entitled Imaging Properties of Ruled and Holographic Gratings, in Journal of the Spectroscopical Society, volume 23, Supplement No. 1, 1974, describes the diagram of the optical arrangement, specifying all the notations used to characterize (a) the grating, (b) the spatial position of the source point, (c) the spatial position of the image point and (d) the spatial position of the recording points (cf. FIG. 1A). Moreover, this article gives the expression for the optical path deduced from Fermat's principle and expressed as a function of the pupil coordintes (w, l).

The optical path $F = <AP< + <PB< + mn\lambda$ is expressed by:

$$F = (r + r')\left(1 + \frac{z^2}{r^2}\right)^{\frac{1}{2}} -$$

$$w\left[(\sin \alpha + \sin \beta)\left(1 + \frac{z^2}{r^2}\right)^{-\frac{1}{2}} - \frac{m\lambda}{\lambda_o}(\sin \delta - \sin \eta)\right] -$$

$$\frac{wl}{R} \frac{z}{r}\left(\frac{\sin \alpha}{e} - \frac{\sin \beta}{e'}\right) +$$

$$\frac{w^2}{4R} \frac{z^2}{r^2}\left[2\frac{\sin^2 \alpha}{e} + \frac{2\sin^2 \beta}{e'} - (T + T')\right] -$$

$$\frac{l^2}{4R} \frac{z^2}{r^2}\left[\frac{2}{e} + \frac{2}{e'} + S_2 + S_2'\right] +$$

$$\frac{w^2 l}{2R^2} \frac{z}{r}\left[\frac{T}{e} - \frac{T'}{e'} + \frac{2\sin^2 \beta}{e'^2} - \frac{2\sin^2 \alpha}{e^2}\right] +$$

$$\frac{w^2}{2R}\left[T + T' + \frac{m\lambda}{\lambda_o}(H - H')\right] +$$

$$\frac{l^2}{2R}\left[S_2 + S_2' + \frac{m\lambda}{\lambda_o}(K_2 - K_2')\right] +$$

$$\frac{w^3}{2R^2}\left[T\frac{\sin \alpha}{e} + T'\frac{\sin \beta}{e'} +\right.$$

$$\left.\frac{m\lambda}{\lambda_o}(H\rho_C \sin \eta - H\rho_D \sin \delta)\right] +$$

$$\frac{w^4}{8R^3}\left[S_1 + S_1' + \frac{m\lambda}{\lambda_o}(K_1 - K_1') +\right.$$

$$\left(\frac{4\sin^2 \alpha}{e^2} - \frac{T}{e}\right)T + \left(\frac{4\sin^2 \beta}{e'^2} - \frac{T'}{e'}\right)T' +$$

$$\left.\frac{m\lambda}{\lambda_o}\{H(4\rho_C^2 \sin^2 \eta - \rho_C H) - H'(4\rho_D^2 \sin^2 \delta - \rho_D H')\}\right] +$$

$$\frac{w^2 l^2}{4R^3}\left[\frac{S_1 + S_1'}{t} - \frac{2\sin^2 \alpha}{e^2}S_2 + \frac{2\sin^2 \beta}{e'^2}S_2' -\right.$$

$$\frac{TS_2}{e} - \frac{TS_2'}{e'} + \frac{m\lambda}{\lambda_o}\left\{\frac{K_1 - K_1'}{t} + 2K_2\rho_C^2 \sin^2 \eta -\right.$$

$$\left.\left. 2K_2'\rho_D^2 \sin^2 \delta - HK_2\rho_C + H'K_2'\rho_D\right\}\right] +$$

-continued $$\frac{wl^2}{2R^2}\left[S_2\frac{\sin \alpha}{e} + S_2'\frac{\sin \beta}{e'} +\right.$$

$$\left.\frac{m\lambda}{\lambda_o}(K_2\rho_C \sin \eta - K_2'\rho_D \sin \delta)\right] +$$

$$\frac{l^4}{8R^3 t^2}\left[S_2\left(1 - \frac{S_2}{e}\right) + S_2'\left(1 - \frac{S_2'}{e'}\right) +\right.$$

$$\left.\frac{m\lambda}{\lambda_o}\{K_2(1 - K_2\rho_C) - K_2'(1 - \rho_D K_2')\}\right] + \ldots 5. \text{ a. h. O.}$$

(equation 1), in which:

$r = Re, r' = Re', p = tR,$ $\rho_c = R/r_c, \rho_D = R/r_D,$ $T = (\cos^2 \alpha/e) - \cos \alpha, T' = (\cos^2 \beta/e') - \cos \beta,$ $S_1 = (1/e) - \cos \alpha, S_1' = (1/e') - \cos \beta,$ $S_2 = (1/e) - (\cos \alpha/t), S_2' = (1/e') - (\cos \beta/t),$ $H = \rho_c \cos^2 \eta - \cos \eta, H' = \rho_D \cos^2 \delta - \cos \delta,$ $K_1 = \rho_c - \cos \eta, K_1' = \rho_D - \cos \delta,$ $K_2 = \rho_c - (\cos \eta/t), K_2' = \rho_D - (\cos \delta/t),$ The aberrational optical path $\Delta(w, l) = F_o - F$ (equation 2) is considered to be the sum of two terms $\Delta_1(w, l)$ and $\Delta_2(w, l)$ respectively characterizing the aberrational optical path in the object space and that in the image space.

The fundamental concept used in the invention can therefore be formulated in the following manner: if the mounting is stigmatic, then $\Delta_1(w, l)$ and $\Delta_2(w, l)$ can be expressed by:

$$\Delta_1(w,l) = A(w,l,R,V)\phi_1(e,\alpha,\rho_o,\eta) \qquad [2a]$$

$$\Delta_2(w,l) = B(w,l,R,V')\phi_2(e',\beta,\rho_D,\delta) \qquad [2b]$$

A and B are functions depending solely on the pupil coordinates, the radius of curvature R and a constant V or V' depending on the characteristics of the hologram. The effect of making the functions $\phi_1$ and $\phi_2$ zero is thus to make the optical path stationary, irrespective of the aperature. It is recalled that, in the generally accepted theories, the values of $\Delta$ are expressed as a function of the pupil coordinates and the coefficients of aberration, that is to say by:

$$\Delta_1(w,l) = \Sigma C_{1ij} w^i l^j \qquad [2c]$$

$$\Delta_2(w,l) = \Sigma C_{2ij} w^i l^j. \qquad [2d]$$

The values of Cij depend on various functions of e, e', $\alpha$, $\beta$, $\eta$, $\delta$, $\Sigma_D$ and $\rho_c$. In the present case, the functions $\phi_1$ and $\phi_2$ depend only on the positions of the object and image points.

For $\Delta_1(w, l)$ and $\Delta_2(w, l)$ to be able to be put in the form described in equations 1 and 2, it suffices to impose a specific condition between the position of the source point (S) and one of the recording points (C) and between the position of the image point (S') and the second recording point (D). These conditions form the basis of the invention. The conditions are:

$$[3a] \frac{\sin \alpha}{e} = \rho_c \sin \eta = V \quad \text{(equation A)}$$

$$[3b] \frac{\sin \beta}{e'} = \rho_\eta \sin \delta = V' \quad \text{(equation B)}$$

Two cases will be considered below:
Case 1:
Total separation of the object and image spaces:

$$V \neq V' \sin \alpha = -P \sin \eta \quad [4a]$$

$$\sin \beta = P \sin \delta \quad [4b]$$

Case 2:
Non-separation of the object and image spaces:

$$V = V' = 1/a \quad \text{(equation 3)}$$

$$\sin \alpha + \sin \beta = \rho \eta \lambda_o \quad \text{(equation 4)}$$

Case No. 1, $V \neq V'$ is considered first.

Using the notations of the above mentioned article, the invention will now be explained with reference to the attached drawings, considering firstly the particular case of the use of a concave grating with the object point (entrance slit) located on the normal to the grating (zero angle of incidence $\alpha$) (FIG. 2) as in the prior art (FIG. 1).

In the mounting of the present invention, working at zero incidence (FIG. 2), the basic equation is:

$$\sin \beta = mn\lambda = Pn\lambda_o; P = \frac{m\lambda}{\lambda_o} \quad \text{(equation 5)}$$

$$\sin \delta - \sin \eta = n\lambda_o$$

$\lambda_o$ being the wavelength of the laser used to produce the hologram and having the generally accepted value of 487.986 nm.

In the prior art, considering a conventional type I grating with equidistant and parallel lines, the source $S_1$ is located at $C(\alpha=0, e=1, r=R)$, which is the center of curvature of the grating (FIG. 1). The image forms at $S'_1$ on the Rowland circle of diameter R. Focusing in the horizontal plane is satisfied (equation of the tangential focal lines $T+T'=0$ with $T=0$ and $T'=0$, optical path terms in $W^2$). The coma term in $W^3$ is zero, but the astigmatism and the coma in $L^2W$ can only be made zero simultaneously if the grating is spherical or toroidal ($r=Re'=R \cos \beta$, cf. J. A. R. Sampson, Techniques of Vacuum Ultraviolet Spectroscopy (Wiley, N.Y., 1967) and M. Pouey, Journal of the Spectroscopical Society, Volume 23, No. 1, 1974, pages 67–81).

In the case of a holographic grating with non-uniform line distribution and with a mounting on the Rowland circle, in order for focusing to be on the Rowland circle and for the coma in $W^3$ to be zero, it is necessary that $H=H''=0$, that is to say that:

$$\rho_o = \frac{1}{\cos \eta}; \rho_D = \frac{1}{\cos \delta} \quad \text{(equation 6)}$$

In the case of a spherical grating where one of the recording points C is at the center of curvature ($\eta=0$, $\rho_c=1$), the astigmatism will be characterized by:

$$AL^2 \alpha \left( \frac{\sin^2 \beta}{\cos \beta} - P \frac{\sin^2 \delta}{\cos \delta} \right) L^2 \quad \text{(equation 7)}$$

and the coma in $L^2W$ by $$BL^2W \alpha \left( \frac{\sin^2 \beta}{\cos \beta} \tan \beta - P \cdot \tan \delta \frac{\sin^2 \delta}{\cos \delta} \right) L^2W. \quad \text{(equation 7a)}$$

The pulsed response will only be symmetrical if $\beta = \delta$. Thus, for $\lambda = \lambda_o$ or for $m = \lambda_o$ all the 4th order aberrational terms are non-zero and the aberrational optical path $\Delta(w,l)$ is equal to $F(w,l) - F(o)$.

FIGS. 1 and 1A illustrate, respectively a prior art spectrometer mounting and a grating used in said mounting. In FIG. 1A, luminous point A $(r,\alpha,z)$ is shown on the entrance slit of an image point B $(r',\beta,z')$. $P(u,w,\iota)$ is a point located on the nth line from the origin O, and $C(\eta,r_c)$ and $D(\delta,r_D)$ are the luminous source points used for recording a hologram. In FIG. 1, a stigmatic solution is shown, as in French Pat. No. 70/27,186 and its Certificate of Addition No. 73/625, wherein the source point S, and one of the recording points C are at the center of curvature O' of the grating and the stigmatic image point (all the aberrations being zero) is at $S''_1$ (FIG. 1) with $$r''_1 = Pr_D. \quad \text{(equation 8)}$$

The 2nd recording point D, located at $D_1$, is characterized by the angle $\delta$ such that $\sin \delta = n\lambda_1$ and by $$r_D = \frac{R}{P} \cdot [P \cos \delta + \sqrt{1 - P^2 \cos^2 \delta}] \quad \text{(equation 8')}$$

(cf. FIG. 1 again).

In accordance with the known concepts, to produce a spectrometer (or a monochromator) the condition of focusing in the horizontal plane is satisfied first by considering that the sum of the tangential object and image focal lines must be zero. This is used to deduce, for a position of the source point, a position of the image and a condition relating to the localization of the recording points (cf. again to J. A. R. Sampson, Techniques of Vacuum Ultraviolet Spectroscopy (Wiley, N.Y., 1967) and M. Pouey, Journal of the Spectroscopical Society, Volume 23, Supplement No. 1, 1974, pages 67–81). It is therefore necessary to determine the conditions under which the sagittal focal line (focusing in the vertical plane) can be made to coincide with the tangential focal line, which imposes a second condition for the focusing of the recording points. With the condition relating to the value of n, there remains only one relationship making it possible, if really necessary, to correct one of the coma terms (cf, M. Pouey, above mentioned article).

FIG. 2 illustrates the present invention wherein the object space and the image space (optical path terms carrying the prime in equation 1) are considered separately. The image distance deduced from the equations for the sagittal focal line is imposed as the image distance. It is therefore necessary to determine the conditions for which the tangential focal line can be made to coincide with the sagittal focal line.

As shown in FIG. 2, a spherical grating is used wherein the source S and the recording point C are on the normal to the grating ($\alpha = \eta = 0$).

The image space is considered first:

For any wavelength $\lambda$ and a value of n, according to equation 2, $\beta$ and $\delta$ are fixed. According to the present invention, in the procedure described above, the image distance is characterised by:

$$r'_2 = R[\cotan \delta \sin \beta + \cos \beta] \qquad \text{(equation 9)}$$

the second source point D being characterised by $\delta$ and by:

$$r_D = r'_2/P \qquad \text{(equation 9')}$$

The locus of the images corrected for the astigmatism and the coma is therefore a circle $P_1$ of radius $R' = R/(2 \sin \delta) = R/(2 \cos \beta_o)$, centered at $O'''$ on the diffracted ray and passing through the top O of the grating $R_1$ and its center of curvature $o'$ (FIG. 2). The maximum image distance is equal to $R/\cos \beta_o$ with $\sin \beta_o = \cos \delta$, $\cos \beta_o = \sin \delta$).

The object space is now considered.

The position of the source point $S(\alpha = 0)$ can be chosen arbitrarily along the normal to the grating $R_1(r-Re)$. Then the position of the recording point C is characterized by $\eta = 0$ and by $\rho_c = R/r_c$, such that:

$$1/e = 1 - P(\rho_c - 1) \qquad \text{(equation 10)}$$

In this case, according to the image quality criterion valid for the strong aberrations (4th order aberrations $> \lambda$), the limiting resolution $<\Delta\lambda>$ will be given by:

$$\frac{mn<\Delta\lambda>}{\cos \beta} = 5.18 \cdot 10^{-2} \frac{W^3}{R^3} PH^2 \left( \frac{P}{e} + \rho_c \right) \qquad \text{(equation 11)}$$

(cf. M. Pouey, J. Opt. Soc. Am., 64 (1974), 1616, and French Pat. Nos. 71/04,085 and 72/14,214).

However, in this configuration all 4th order aberrations are proportional to $H^2(P/e + \rho_o)$. These are zero for $H = 0$, which corresponds to the stigmatic point already known (French Pat. No. 70/28,625) (S at O') but also for $$r_c = r/P; \; r = R(1-P); \; P \neq +1 \qquad \text{(equation 12)}$$

This last condition is particularly interesting because it is valid for all wavelengths.

It is therefore clear that, if the image is located on the circle of radius $R' = R/(2 \sin \delta)$ and if the object point is localized so as to satisfy equation 12, the dispersive lens formed by the previously defined grating will be perfectly stigmatic.

Furthermore, it is clear that the image point $S'$ can be used as a source point with the image then forming at S on the normal to the grating.

For certain plasma diagnostics it is important to observe a spectral range of several tens of angstroms.

For a given holographic grating, there is a wavelength $\lambda_1(\beta = \beta_1)$, according to the above, which corresponds either to a stigmatic image or to an image corrected for the comas and the astigmatism, with which a value of is associated. For wavelengths similar to $\lambda(\beta = \beta_1 + \Delta\beta)$, the focusing law in the horizontal plane will be:

$$\frac{\cos^2 \beta}{e'} - \cos \beta + \sin \beta \sin \delta \cos \delta = 0. \qquad \text{(equation 13)}$$

The image distance $r' = Re'$ is a function of $\beta$, and, therefore, not located on the circle $P_1$. In the general case, the focusing locus is a curved surface which can be compared, for small values of $\Delta\beta$, with an arc of a circle.

However, for all wavelengths similar to $\lambda^x$ such that $\beta_1^x \cong 32.9°$, that is to say such that $$mn\lambda_1^x = \sin \beta_1^x = \cos \delta_1 = 0.5432 \qquad \text{(equation 14)}$$

the variations, as a function of $\Delta\beta$, in the curvature of the focusing locus are zero. The latter is a circle of radius $1.208R$ whose tangent at $S'_2$ forms an angle of about $80.52°$ with the direction of the diffracted ray. The image distance $r' = OS'_2$ is deduced from equation (9).

For all wavelengths similar to $\lambda_2^x$ such that $\beta_2^x \cong 37.425°$, and $$mn\lambda_2^x = \sin \beta_2^x = \cos \delta_2 = 0.6077, \qquad \text{(equation 15)}$$

the focusing locus is a plane $P'$ forming an angle of about $73.8°$ with the direction of the diffracted ray. The image distance is $$r' = R \cos \beta_2^{-1} = R \sin \delta_2^{-1} \cong 1.26R$$

(see FIG. 2).

Solutions valid only for grazing incidence ($\lambda < 50$ nm) and not, as in the present invention, for normal incidence based on another procedure, were proposed by Jobin at Yvon (cf. VI International Conference on Vacuum Ultraviolet Radiation Physics, June 2-6, 1980, University of Virginia, Charolottesville, Va., U.S.A., III-21).

In the negative orders, for all wavelengths similar to $\lambda_3^x$ such that $$\tan \beta_3^x = -\sin \delta(\sin \delta + \cos \delta) \qquad \text{(equation 16)}$$

and for $\delta > 45°$ ($r > 0$), the focusing locus is a circle centered at $0''$, which is the center of the Rowland circle, and of radius:

$$R_c = \frac{R}{2} \left[ \frac{\sin \delta + \cos \delta}{\sin \delta} \right]. \qquad \text{(equation 17)}$$

For example, for $\delta = 77.4145°$, $n = 2$ lines/$\mu$m, $\beta_3^x \cong -49.36°$, $m = -1$ ($\lambda_3^x \cong 379.4$ nm), $R_c \cong 0.568 R$, and $r = 0.48185 R$.

The production of lenses with high magnifications for the near and far ultraviolet, according to the present invention, will now be considered.

For any optical device, the limiting resolution is imposed by the diffraction and hence by the wavelengths at which perfectly corrected lenses can be produced.

By way of example, a stigmatic device is hereinafter described which can work at 121.6 nm, because there are intense, stable and reproducible sources for this wavelength.

The practical applications of a device of this type are numerous; for example, the reproduction of masks used to produce VLSI semiconductor microcircuits.

According to the present invention, the following are considered:

a fixed grating whose blaze angle will be optimised, by any known means, for operating in the order m, and which is covered with suitable reflecting layers (for example $Al+MgF_2$);

an object illuminated by a monochromatic source, located perpendicular to the normal to the grating and located at a distance r from the top of the grating; and a plane detector located at a distance r' from the top of the grating, the diffraction angle $\beta_4 = -\beta^x$ corresponding to operation in the negative orders.

The object distance will be, according to equation (9):

$$r = R\left[\frac{\sin \delta + \sin \beta^x}{\sin \delta}\right] \quad \text{(equation 18)}$$

and the image distance will be:

$$r' = R[\cos \beta^x - \cotan \delta \sin \beta^x] \quad \text{(equation 19)}$$

the magnification being equal to:

$$\Gamma = \frac{r'}{r} = \frac{\sin(\delta - \beta^x)}{\sin \delta + \sin \beta^x} \quad \text{(equation 20)}$$

For $\beta_4 = -\beta^x = -50°$, $\delta = 50.2°$, $r' \sim 4.5 \cdot 10^{-3} R$, $r \sim 2R$ and $I \sim 1/444 \sim 2.25 \cdot 10^{-3}$.

If the recording points are:

$$C[\eta = Or_c \cong 20 R]$$

$$D[\delta = 50.2° r_d \cong 4.5 \cdot 10^{-2} R]$$

then the device will be strictly stigmatic for all wavelengths such that $m\lambda \cong -0.48656$ μm, that is to say for $L\gamma\alpha$ (121.6 nm) in the negative 4th order. The limiting resolution of the device will be imposed by the diffraction, 0.85 (R/W) μm, or fractions of microns for apertures of f/25. Taking account of the values of r', it is necessary to work with high values of R since the object distance then is large. In this case, the beam can be bent with the aid of plane mirrors. The practical limiting resolution is therefore influenced by the quality of the grating and of the surface conditions of the mirrors, as well as by the mechanical stability of the system. These problems are easily solved with the technical solutions currently known.

Mountings working at any incidence are now considered. Under these conditions:

$$\rho_o \sin \eta = \frac{\sin \alpha}{e} = V = \text{constant} \quad \text{(equation 3a)}$$

$$\sin \alpha = -P \sin \eta; P = \frac{m\lambda}{\lambda_o} \quad \text{(equation 4a)}$$

and $\Delta_1(w,l)$ is expressed as follows:

(equation 2e)

$$\Delta_1(w,l) = -\left[\frac{w^2}{2R} + \frac{v w^3}{2R^2} + \frac{V^2 w^4}{2R^3}\right](T + PH) -$$

-continued $$\left[\frac{l^2}{2R} + \frac{V l^2 w}{2R^2} + \frac{w^2 l^2(1 + 2V^2)}{4R^3} + \frac{l^4}{8R^3}\right]$$

$$(S_2 + PK_2) + (T^2 - P^2H^2)\frac{w^4}{8R^3 e} + (TS_2 - P^2HK^2)\frac{w^2 l^2}{4R^3 e} +$$

$$(S_2{}^2 - P^2K_2{}^2)\frac{l^4}{8R^3 e} + \ldots 5, a, h, 0.$$

In this process, the function $\phi_1(e,\alpha,\rho_c,\eta)$ is represented in equation 2e by $T+PH$ and $S_2+PK_2$.

According to relationships 3a and 4a, we can write:

(equation 21)

$$T + PH = \frac{\cos^2 \alpha}{e} - \cos \alpha + P[\rho_c \cos^2 \eta - \cos \eta]$$

$$= \frac{1}{e} - \cos \alpha + P[\rho_c - \cos \eta] - V[\sin \alpha + P \sin \eta]$$

$$= S_2 + PK_2$$

Since the coefficient of V is zero according to equation 4a, $\Delta_1(w,l)$ will be zero if $S_2+PK_2$ or $T+PH$ is zero.

The expression for the sagittal and tangential focal lines is therefore unique and gives rise to the stigmatism. The locus of the images can be considered as that which would be deduced, according to classical theories, from the locus of the particular expression for the sagittal focal line, that is to say of:

$$1/e - \cos \alpha + P[\rho_c - \cos \eta] \quad \text{(equation 21a)}$$

In practice, in equation 21a it is necessary to take account of the value of $\rho_c = -P/e$ deduced from relationships 3a and 4a. The locus of the object points is given by $$r = Re = R[\sin \alpha \cotan \eta + \cos \alpha]. \quad \text{(equation 21b—circle } P_1')$$

The locus of the object points for obtaining a strictly stigmatic image is therefore a circle $P_1'$ of radius $R/(|2 \sin \eta|)$, centered in the direction $\pm \sin \alpha_o = \cos \eta$ and passing through the top of the grating and its center of curvature, with $|\sin \eta| = \cos \alpha_o$.

In the particular case, already described above, of normal incidence ($\alpha = \eta = 0$), there are several solutions:

the object point A and one of the recording points C are at the center of curvature:

$$r = Re = R; e = 1; \alpha = 0$$

$$r_c = R/\rho_c; \rho_c = 1; \eta = 0$$

the object point A is defined by:

$$\alpha = 0; r = Re = R(1 = P).$$

The recording point C is such that:

$$\eta = 0; \rho_c = \frac{P}{e} = \frac{P}{P-1}; r_c = \frac{R}{\rho_c}$$

For any other position of the object point on the normal to the grating, spherical aberration will remain. And its influence on the quality of the image will depend on the aperture (cf. image quality criterion mentioned by M. Pouey, J. Opt. Soc. Am. 64 (1974), page 1616).

If $$\Delta(w,l) = C_{04}w^4 + C_{22}w^2l^2 + C_4l^4 \quad \text{(equation 2f)}$$

$$= \frac{A}{8R^3} w^4 + \frac{2Aw^2l^2}{8R^3} + \frac{Al^4}{8R^3} \leq \lambda$$

an image limited by diffraction will be obtained, according to the modified STREHL criterion, if the width $W^*$ of the grating and its height $L^R = \rho W^x$ are such that:

$$\frac{180\lambda^2}{2} \geq \frac{W^8}{64R^6} A^2 \left[ 1 + \frac{10}{7} \rho^2 + 4\rho^4 \right] \quad \text{(equation 22)}$$

with $A = PH^2 \left[ \frac{P}{e} + \rho_c \right]$

In the case of strong aberrations $\Delta > \lambda$, the quality of the image will be defined by:

$$mn < \Delta\lambda > = \frac{A}{1} \frac{W^3}{6R^3} \sqrt{B(\rho)} \quad \text{(equation 23)}$$

with $W > W^x$ and $\beta(\rho) = \frac{1}{7} + \frac{2\rho^2}{15} + \frac{\rho^4}{60}$ $<\Delta\lambda>$ being the mean quadratic value of the width at half-height of the pulsed response.

In the image space, the locus of the images is the circle of radius $R/(2 \sin \delta)$, described previously.

FIG. 8 illustrates an arrangement for precise values of $\eta$ and $\delta$ and for an angle of incidence $\alpha \neq 0$.

FIG. 8 shows a circle $P_1$ of radius $R' = R/(2 \sin \delta)$ centered at $O''$, the center of curvature of said grating. The dotted line of this circle $P_1$ corresponds to the negative order cases:

$$P = \frac{m\lambda}{\lambda_o} < 0$$

In this figure, the circle $P_1$ is the locus of the diffracted image ($r'\beta$) corrected for astigmatism and coma.

As described in the invention, the object could be located either at $O'$ or $S_1$ both on the grating normal. The source $S$ could also be located on a circle $P'_1$ centered at $O'''$ and passing through $O$ and $O'$. The dotted line of said circle $P'_1$ corresponds also to the case of negative orders. $P > 0$ means of course positive orders.

Case of a Source Point Outside the Median Plane

If $z$ is the dimension of the object point ($z' = r'/r \, z$ being that of the associated image point) and $\theta_V = 2z/r$ is the corresponding vertical field, the principal aberration is characterized by:

$$C_{12}w^2l = -\frac{w^2}{2R^2} \theta_V \left[ \frac{T}{e} + \frac{T}{e'} - \frac{2\sin^2\beta}{e'^2} - \frac{2\sin^2\alpha}{e^2} \right] = \quad \text{(equation 24)}$$

-continued $$\frac{w^2 l}{2R^2} \theta_V [y'^2 (2 + \cotan \rho \cotan \delta) + y^2 (2 + \cotan \alpha \cotan \eta)]$$

It will therefore be appropriate to work in the negative orders and, if the object is either at infinity or at the center of curvature, $C_{12}$ can be made zero if cotan $\beta_o = -2 \tan \delta$.

Magnifications

These dispersive holographic lenses working at one wavelength have anamorphosis properties resulting from the unidirectional effect of the diffraction by the lines. In fact, in the vertical plane, the magnification has the value $g_y = r'/r = e'/e$, but in the horizontal plane, it is expressed by $$g_x = \frac{dx'}{dx} - \frac{e' \cos \alpha}{e \cos \beta} \quad \text{(equation 25)}$$

Case of an Object at Infinity ($V \neq V'$)

In the following, it is considered that the image forms on the circle of radius $R/2 \sin \delta$. If the object is located at infinity, $\eta$ and $\alpha$ must also be zero, according to relationships A and C. All the 2nd and 3rd order aberration terms will therefore be zero if:

$$r_c = RP(P+1)^{-1}; \, \eta = 0 \, e = \infty; \, \alpha = 0 \quad \text{(equation 26)}$$

The only aberration terms are then the fourth order terms:

$$\Delta_1(w,l) = \left( \frac{(w^2 + l^2)^2}{8R^3} \right) \left( \frac{(P+1)}{P^2} \right) \quad \text{(equation 2-g)}$$

They are zero for $P = -1$. For any value of $\beta$, the aperature tolerance will be given by the modified STREHL criterion. To be limited only by diffraction, it will be necessary to satisfy $$\lambda \geq 0.558 \left( \frac{P+1}{P^2} \right) \Omega^3 W \quad \text{(equation 27)}$$

If $\Omega = W/R$, the limiting resolution in the image space is given by:

$$\Delta X' = 0.6975 \left( \frac{P+1}{P^2} \right) \Omega^2 (1 + \tan \beta \cotan \delta) W. \quad \text{(equation 28)}$$

The applications of a device of this type are numerous—laser writing, production of masks for microlithography, and so on.

For an ionized argon laser ($\lambda = 363.8$ nm, $W = L = 1.6$ mm), by working in the order $m = -1$ ($\delta = 65.287°$, $\beta = -42.6279°$) and with an image distance $r' = 0.424089 \, R$, $\Omega$ has the limiting value 0.09619; therefore, for $R \geq 16.6$ mm:

$$\Delta X' \geq \frac{r'\lambda}{W} = 0.09643 \, R \geq 1.6 \, \mu m \quad \text{(equation 29)}$$

Case No. 2 where $V=V'=1/a$ (equation 3) will now be considered.

The aberrational optical path is expressed by (equation 2-h):

$$\Delta(w,l) = -\left[\frac{w^2}{2R} + \frac{1}{a}\frac{w^3}{2R^2} + \frac{1}{a^2}\frac{w^4}{2R^3}\right]\bar{T} -$$

$$\left[\frac{l^2}{2R} + \frac{1}{a}\frac{l^2w}{2R^2} + \frac{w^2l^2}{4R^3}\left(1 + \frac{2}{a^2}\right) + \frac{l^4}{8R^3}\right]\bar{S} +$$

$$\left[\frac{T^2}{e} + P\rho_c H^2 + \frac{T'^2}{e'} - P\rho_D H'^2\right]\frac{w^4}{8R^3} +$$

$$\left[\frac{TS_2}{e} + PS_2\rho_c + \frac{TS'_2}{e'} - PH'K'_2\rho_D\right]\frac{w^2l^2}{4R^3} +$$

$$\left[\frac{S_2^2}{e} + PK_2^2\rho_c + \frac{S'_2{}^2}{e'} - PK'_2{}^2\rho_D\right]\frac{l^4}{8R^3} + \ldots 5, a, h, 0,$$

with, according to equations (3 and 4), $$\bar{T}=\bar{S}=S_2+S'_2+P(K_2-K_2')$$

If, in the present application, the most general case is considered in which the angle of incidence on the grating is different from zero, according to the above results, then the locus of the images corrected for the astigmatism and the coma is determined by the equation for the digital focal line ($\bar{S}=0$):

$$1/e - \cos\alpha + 1/e. -\cos\beta + (Q-R)(K_2-K_2') = 0 \quad \text{(equation 30)}$$

with $$\sin\alpha = Qn\lambda_o;\ \sin\beta = -Rn\lambda_o \quad \text{(equation 31)}$$

$$P = \frac{m\lambda}{\lambda_o} = \frac{\sin\alpha + \sin\beta}{n\lambda_o} = Q - R \quad \text{(equation 31')}$$

$$\rho_c\sin\eta = \frac{\sin\alpha}{e} = \rho_D\sin\delta = \frac{\sin\beta}{e'} = \frac{1}{a} \quad \text{(equation 3)}$$

Equation 30 characterizes the generalized focusing method of the present invention. To show the applications of this method, several illustrative examples are given:

(A) Particular case No. 1; $\beta = -\eta$, $n\lambda_o = 2\sin\delta$

Equation 30 is then written as follows:

$$\frac{1}{e}\left[1 - \frac{2\sin^2\alpha}{n^2\lambda_o^2} - \frac{2\sin\alpha\sin\beta}{n^2\lambda_o^2}\right] - \cos\alpha + \quad \text{(equation 30')}$$

$$\frac{1}{e'}\left[1 - \frac{2\sin^2\beta}{n^2\lambda_o^2} - \frac{2\sin\alpha\sin\beta}{n^2\lambda_o^2}\right] - \cos\beta = 0$$

For the case of an object at a finite distance, let $\Gamma$ be the magnifications such that:

$$e'/e = -\Gamma \quad \text{(equation 32)}$$

It will therefore be necessary to satisfy:

$$+\frac{1}{e}\left[\frac{\Gamma-1}{\Gamma} - \frac{4\sin\alpha\ mn\lambda}{n^2\lambda_o^2}\right] = \cos\alpha + \cos\beta \quad \text{(equation 33)}$$

with $$mn\lambda = \sin\alpha + \sin\beta = \sin\alpha(1-\Gamma) \quad \text{(equation 34)}$$

in order to satisfy:

$$\frac{\Gamma^2 - 1}{\Gamma e} = \cos\alpha + \cos\beta \quad \text{(equation 35)}$$

with $n^2\lambda_o^2 = 4\sin^2\alpha$ \quad (equation 36)

For a given angle of incidence, the pitch of the grating is fixed, and to each wavelength there coresponds an angle of diffraction $\beta$ with which an image distance deduced from the value of $\Gamma$ satisfying equation 35 is associated.

For example, if the angle of diffraction $\beta = -2\alpha$, the value of $\Gamma$ is $2\cos\alpha$ and the object distance is given by:

$$re = \frac{R[4\cos^2\alpha - 1]}{2\cos\alpha(\cos\alpha + 2\cos^2\alpha - 1)} \quad \text{(equation 37)}$$

and the image distance by:

$$r' = Re' = -2\cos\alpha eR \quad \text{(equation 38)}$$

For $\alpha = 30°$, $e \simeq 0.8453$, $\beta = -60°$ and $n = 1.4315$ lines/$\mu$m, the mounting is stigmating for $\lambda = 255.6$ nm in the order $m = -1$.

For $\Gamma = -1$, that is to say in the case of a Littrow type mounting ($\theta = \alpha = -\beta$) working at a magnification of one (source and image superimposed in space), equation 30' is written as follows:

$$\frac{2}{e}\left[1 - \frac{m^2n^2\lambda^2}{n^2\lambda_o^2}\right] = \cos\alpha + \cos\beta = 2\cos\theta \quad \text{(equation 39)}$$

if $n\lambda_o = 2$, $e = \cos\theta$. This again gives a configuration of the stigmatic Rowland type in which it is possible to work outside the plane. With a 1 meter grating and an aperture of f/10, for $\theta = 30°$, the displacement of the source point outside the plane in the vertical direction parallel to the 7 mm lines introduces an operating difference of only one wavelength. The entrance slit can therefore be lcoated one centimeter above the plane of the Rowland circle, with the detector being located below the latter.

(B) Particular case No. 2; $\delta - \eta = 2\alpha$

For any $\delta$ and $\eta$, equation 19 is written as follows:

$$\frac{F(\alpha)}{e} + G(\alpha) + \frac{F(\beta)}{e'} + G(\beta) = 0. \quad \text{(equation 40)}$$

The functions F and G, depending on $\delta$ and $\eta$, are given by:

$$F(\alpha) = 1 + \frac{\sin^2\alpha}{\sin\delta\sin\eta} \quad \text{(equation 41)}$$

-continued $$G(\alpha) = \frac{2}{n\lambda_o} \times \cos\left(\frac{\delta + \eta}{2} - \alpha\right) \sin\left(\frac{\delta - \eta}{2}\right) \quad \text{(equation 42)}$$

The object space and the image space can be treated separately; in fact, in the object space, it will be necessary to satisfy:

$$\frac{1}{e \sin \delta} = \frac{V^2(1 - t^2) + 2 Vt}{-V^3 + V^2(1 - 2t^2) + tV(2 - t^2) + t^2} \quad \text{(equation 43)}$$

if $t = \tan \alpha$ and $V = \tan \eta$.

For example, for $\tan^2 \alpha = 2$ ($\alpha = \pm 57.7356°$), we have $\delta - \eta = 109.947°$ $\alpha > 0$, e being positive if $-45° \leq \eta \leq 69.89°$. For $\eta = -65°$, $\delta = 44.47122°$; $n = 3.2928$ lines/$\mu$m;

$e = 0.2589$ $\rho_c \sin \eta = 3.15356$; $\rho_c = -3.47957$ $\rho_D = 4.501556$ The values of the image distances and of the angles of diffraction are then given by equation 3 and by:

$$\tan \beta = \frac{X_2 \pm \sqrt{X_2^2 - 4 - 4(X_3 - X_1)}}{2(1 + X_3 - X_1)} \quad \text{(equation 44)}$$

$$X_1 = -\frac{1}{\sin \delta \sin \eta}$$

$$X_2 = \frac{2}{n \lambda_o} \cdot \sin\left(\frac{\delta - \eta}{2}\right) \cdot \cos\left(\frac{\delta + \eta}{2}\right) \cdot \frac{\sin \alpha}{e}$$

$$X_3 = X_2 \tan\left(\frac{\delta + \eta}{2}\right)$$

These examples show that, for an object point and a given grating, and for an appropriate angle of difraction, there is always an image distance for which the image obtained is corrected for the stigmatism and the coma. In particular, it is possible to obtain images at very high resolution, even at very short wavelengths.

In the previous example, for $\beta = -78.98°$, $e' = -0.311249$, the stigmatism wavelength is 41.2 nm in the order $m = -1$, or 20.6 nm in the order $m = -2$.

Stigmatic spectroscopic devices will now be considered which work simultaneously in several spectral ranges with a single grating.

In the above description, the advantage of the concepts for which the characteristics of the holograms were directly related to the wavelength via the angles of incidence and diffraction ($r_D = \sin \delta r'/\sin \beta$) was shown for various configurations. Consideration is now given to a concave (or convex) spherical holographic grating produced with two source points C and D whose proximities are independent of the working wavelength, and in particular to the following case:

$$\frac{1}{r_c} = \frac{\rho_c}{R} = \frac{a-1}{R \sin \eta} ; \frac{1}{r_D} = \frac{\rho_D}{R} = \frac{a-1}{R \sin \delta}$$

In FIG. 3, which illustrates also the classical Rowland Circle (ROW) of diameter OO', according to the present invention the source S and the image S' are positioned on the circle of radius Ra passing through the top O of the grating and centered at $\overline{O}$ on the tangent to the top of the grating fixed in space. Consequently:

$r = Re = aR \sin \alpha$ (equation 46)

$r' = Re' = aR \sin \beta$ (equation 47)

The recording of the hologram is such that:

$r_c = aR \sin \eta$ (equation 48)

$r_D = aR \sin \delta$ (equation 49)

FIG. 9 illustrates the case where the source and the image are located on circles of radius aR.

In the following, the case where $a = 1$ will be considered. It is important to observe that a can be any integer or fraction except 0.

It can be shown that all the coefficients of aberration characterizing the astigmatism, the comas and the focusing defect (terms in $l^2$, $l^2w$, $w^3$ and $w^2$) are proportional to:

$$\phi = \phi_1 + \phi_2 \quad \text{(equation 50)}$$

$$= \sin \alpha^{-1} [\cos^2 \alpha - \sin \alpha \cos \alpha + C \sin^2 \alpha] +$$

$$\sin \beta^{-1} [\cos^2 \beta - \sin \beta \cos \beta + C \sin^2 \beta]$$

with, for $C = \frac{H - H'}{n\lambda_o} < 0$ and $\delta = -\eta$ (equation 51)

$$\tan \delta = \sqrt{-\frac{1}{c}} \; ; \; 2 \sin \delta = n\lambda_o$$

For a given angle of incidence, $\phi_1$ is constant and $\phi_2$ is zero for all the values of $\beta$ such that:

$$\cos \beta = \sqrt{\frac{c}{c - 1}} \quad \text{(equation 52)}$$

The values of $\alpha$ are deduced from the equation:

$(Ct^2 + 1)([c + 1 - c^2]t^2 + 2[c - 1]t - [c - 1]) = 0$ (equation 53)

in which $t = \tan \alpha/2$.

The pulsed response is therefore symmetrical for wavelengths $\lambda^x$ such that:

$\lambda^x = 0$ central spot (equation 54)

$$\frac{m \lambda^x}{\lambda_o} = \frac{\sin \alpha}{\sin \delta} \; ; \tan \alpha = \pm \sqrt{-\frac{1}{c}} \quad \text{(autocollimation)}$$

$$\frac{m \lambda^x}{\lambda_o} = \frac{\sin \alpha + \sin \beta}{2 \sin \delta} \; ;$$

$$\tan \alpha = \frac{1 - C \pm \sqrt{C(C - 1)(2 - C)}}{C + 1 - C^2}$$

The autocollimation solution is particularly interesting because the device can work in high orders, which increases the limiting resolving power. For example, in the 3rd order, it is possible to observe the CV and OVII lines, and measuring the broadening of these lines gives fundamental information relating to the density and the ion temperature of the plasmas. FIG. 5 graphically illustrates the other solutions for the order $m = -1$ and $m = +1$. In FIG. 5, the left vertical axis gives the stigmatic wavelengths in nanometer units while the right vertical axis gives the number of lines per micrometers (n), the broken line shows the variation of n in function of C characterizing the recording parameters. In the order $m = -1$, and for high values of C (for example $C \cong -15$), the 4th order aberration terms are negligible in terms of the Strehl criterion. There are 2 values of $\alpha$, i.e., 2 similar wavelengths, for which $\Phi = 0$ for which there is strict stigmatism. The device can therefore operate over a range of several tens of angstroms. FIG. 4 gives an example of operation as a monochromator, the source S being refocused with the aid of a toroidal mirror M working at a magnification of one. The toroidal mirror M gives an image $S'_1$ located on the circle $P_2$, which image $S_1$ acts as a virtual object for the grating R, giving a stigmatic real image $S''$ thereof on the circle $P_2$. By displacing the mirror M in the direction of the incident ray MS and by rotating it, it is possible to give a second image $S_2''$ of S, located on the circle $P_2$, which will serve as a second virtual object point for the grating.

For a given hologram $(C = -15)$, equation 50 also has solutions which are different from the particular case above; in fact, if $V = \tan \beta/2$, equation 50 is written as follows:

$$V^4 + 2[\phi_1 + 1]V^3 + 2[2C - 1]V^2 + 2[\phi_1 - 1]V + 1 = 0 \quad \text{(equation 55)}$$

For all the values of $\alpha > 3°$, equation 55 has four real solutions of which at least two are positive. For each value of $\alpha$, there are thus two values of $\lambda$, for the positive orders, for which the pulsed response is symmetrical. The astigmatism and comas are corrected and the 4th order aberrations are negligible in terms of the Strehl criterion.

If the source S and the detector (placed behind the exit slit localized at S') can be displaced over a circle of radius R passing through the top O of the grating and centered at $\overline{O}$ on its tangent, there is obtained, for a given grating, a whole series of wavelength values for which the device is stigmatic within the limits of the approximation of the Strehl criterion. In the case of large apertures and short wavelengths, the quality of the image can be deduced from the geometrical image quality criterion (cf. M. Pouey, Journal of the Spectroscopical Society Am., op. cit.).

Consideration is given here to the case of a concave (or convex) grating giving a real (or virtual) image of a beam coming from infinity at an angle $\alpha$, which image is located on the axis of the grating $(\beta = 0)$ and the two source points are located at infinity according to the condition $V = V'$.

For a point located in the horizontal reference plane perpendicular to the vertical direction of the lines, the condition for absolute stigmatism is written as follows:

$$1/e' = 1 + \cos \alpha + P[\cos \eta - \cos \delta] \quad \text{(equation 56)}$$

If, in addition, $e' = 1$, that is to say if $$\delta + \zeta = \pi + 2\alpha \quad \text{(equation 57)}$$

the vertical field $\theta_V$ which can be used will be high because all the aberration terms proportional to $\theta_V{}^i = (z/2)^i$, i being odd, will be zero. The only 2nd order aberration in $\theta_V$ will be:

$$\Delta(w,l) = -\frac{W^2}{16R} \theta_V{}^2 \cos \alpha \quad \text{(equation 2-i)}$$

To be limited by diffraction, it will be necessary, according to the modified Strehl criterion, to satisfy:

$$\theta^2{}_V W^2 \cos \alpha = 3R\lambda \quad \text{(equation 58)}$$

For a mean quadratic value, expressed in nanometers, of the given pulsed response $<\Delta\lambda>$, it will be necessary to satisfy:

$$mn < \Delta\lambda > = \frac{\theta_V{}^2 \cos \alpha}{16 \sqrt{3} \ R} W \quad \text{(equation 59)}$$

If, on the other hand, $\eta = 0$, $\rho_c = 1$ and $\rho_D = 0$ with $\delta \neq 0$, all the aberration terms are zero if $$1/e' = 1 + \cos \alpha - P \cos \delta \quad \text{(equation 60)}$$

with $\sin \alpha = P \sin \delta$, that is to say if $$r' = R \sin \delta[\sin \delta + \sin(\delta - \alpha)]^{-1} \quad \text{(equation 61)}$$

This solution is particularly suited to the case of grazing incidence $\alpha >> \delta$, the image obtained being real for a convex grating.

CASE OF AN OBJECT AND AN IMAGE AT INFINITY $V = V' = 0$

The concave or convex holographic mirror is then equivalent to a plane mirror having spectral selection properties. At the present time, only plane gratings, used especially in CZERNY-TURNER type mountings, are considered in the literature. However, even for strictly parallel, incident beams, there is introduced into the direction of diffraction wave surface distortions generating a strong coma and a curvature of spectral lines.

According to relationship 3, it will be necessary to satisfy:

$$\frac{\sin \alpha}{e} = \frac{\sin \beta}{e'} = \rho_c \sin \eta = \rho_D \sin \delta = 0 \quad \text{(equation 62)}$$

that is to say, to impose $\rho_D = \eta = 0$, since $e^{-1} = e'^{-1} = 0$. If, in addition, $\eta_c = 1$, the quality of the diffracted beam will be limited only by diffraction and this will be so, whether the holographic mirror is concave or convex, if the following condition is satisfied:

$$-\cos \alpha - \cos \beta + P \cos \delta = 0 \quad \text{(equation 63)}$$

that is to say, if $\alpha + \beta = 2\delta$ is satisfied, with $$P = \frac{m\lambda}{\lambda_o} = 2 \cos \theta \quad \text{(equation 64)}$$

if, as shown in FIG. 10, $2\theta$ is the angle between the incident and diffracted beams.

If, therefore, considering a reference axis OX and a polychromatic incident beam coming from infinity and inclined at an angle $\theta$, symmetrical to the preceding direction, for an order m and a wavelength $\lambda$ such that $m\lambda=2\lambda_o \cos\theta$, and the normal to the holographic mirror forms an angle $\delta$ with the axis OX, this angle defines the angular position of the recording point D located at infinity. The second recording point is located at the center of curvature of the mirror.

Taking into account the optical performance characteristics of the mountings according to the present invention, it is important, from the point of view of mechanical construction, that the essential elements, that is to say the grating support and the slit or slits, should be made with precision and possess adjustment possibilities of appropriate sensitivity.

FIGS. 6A, 6B and 6C illustrate a grating support with independent adjustment parameters, and FIGS. 7A, 7B and 7C relate to a slit with a symmetrical aperture.

In FIGS. 6A, 6B and 6C, XX' is the rotation axis of the grating for the adjustment of its orientatin by autocollimation. YY' is the tilting axis of the grating. The plane tangential to the top of the grating must be vertical. The entrance slit is the vertical of the locus and the normal to the grating being in the horizontal plane. ZZ' is the tilting axis of the lines of the grating (the middle of all the diffracted images must be in the horizontal plane).

Referring to FIGS. 6A, 6B and 6C, the grating R is housed in a casing 12 and fixed by a plate 13 in which there is a rectangular orifice limiting the active surface of the pupil. The casing 12 is held in a support 14 by means of a clamp comprising a nut 15 and a spring washer 16. A bore made in the support 14 and a cylindrical part of the back of the casing 12 define the axis ZZ'. The precision of the mechanical construction and the adjustment of the thickness of the three shims located in the bottom of the casing 12 ensure the positioning of the top of the grating on the axis XX' to within a few hundreths of a micron.

In its upper part, the fork 17, which is firmly fixed to the part defining the axis XX', is constructed with two tappings which, by means of V-notched screws 18 and balls 19, define the axis YY'. The grating R is tilted by the action of two screws tightening the part 21. The leaf spring 20 is gripped between the support 14 of the casing 12 and the part 21.

The rotation of the grating lines is adjusted by means of two opposing screws 22 and 23 with screw 22 acting on the flattened part produced on cylinder portion 24 fixed to the back of the support 14 of the casing 12 of the grating R, and screw 23 acting on a flattened part of the screw 25. A return force is provided by the leaf spring 26.

FIGS. 7A, 7B and 7C illustrate, in section, a slit with a symmetrical aperture.

The casing of the slit consists of a bottom 3 and a cylindrical part 2. Two movable lips 4 and 5 (FIG. 7C) are held flat on the bottom 3 by a part 1. A control button, not shown, causes translational movement of the pin 6, which, by means of the ball 8, produces a vertical thrust on the V formed by the upper part of the two movable lips 4 and 5. The value of the angle is chosen so that a 1.5 mm aperture of the slit corresponds to a 7.5 mm vertical displacement of the pin 6. A 2 micron aperture thus corresponds to a displacement of 1/100. The opposing force is obtained by means of a spring 9 and a ball 11 identical to the ball 8, the spring 9 being held by a part 7 fixed to the cylindrical part 2. The eyelets 10 (FIG. 7B) are used to adjust the verticality of the slit, which must be housed in a casing connected to the vacuum chamber of the spectral device.

Variations and changes in the apparatus for performing the method of the invention may be made by those skilled in the art without departing from the spirit of the present invention. The detailed description of the apparatus is for illustrative purposes only and is not intended to limit the scope and spirit of the invention as set forth in the appended claims.

What is claimed is:

1. A method for focusing spherical holographic diffraction gratings of the reflective type having radius of curvature R, and for dispersing the different radiations making up a polychromatic light comprising the steps of: (a) using a holographic grating, and one of a fixed entrance slit combined with at least one fixed exit slit and a multichannel detector, and (b) adjusting the holographic grating so that for a wavelength $\lambda$ and a diffraction order m such that $mn\lambda=\sin\alpha+\sin\beta$, and for any object distance $r=Re$ (e being the object distance divided by the value of the radius of curvature R of the grating) and any angle of incidence $\alpha$, the image distance $r'=Re'$ (e' being the image distance divided by the radius of curvature R of the grating) is determined, for the angle of diffraction $\beta$, by the relationship:

$$\frac{1}{e} = \cos\alpha + \frac{1}{e'} - \cos\beta + \left(\frac{\sin\alpha + \sin\beta}{n\lambda_o}\right)(k_2 - k'_2) = 0$$

in which $k_2-k'_2=\rho_c-\cos\eta-\rho_D+\cos\delta$, corresponding to the sum of the sagittal object and image equations, in which relationships: n represents the number of lines per mm of the holographic grating produced at the laser wavelength $\lambda_o$ from the recording of interference fringes generated by two source points C and D, respectively defined by their polar coordinates, relative to the top of the grating, as follows:

for the point $C \begin{cases} r_c = R/\rho_c \\ \eta \end{cases}$ and for the point $D \begin{cases} r_D = R/\rho_D \\ \delta \end{cases}$, and such that $$\rho_c \sin\eta = \frac{\sin\alpha}{e} = V; \rho_D \sin\delta = \frac{\sin\beta}{e'} = V',$$

V and V' being constants which can be equal to one another, the intensity distribution of the resulting diffracted image being symmetrical.

2. A method as claimed in claim 1, and applied to a dispersive lens to correct the dispersive lens for astigmatism and coma and locating a source (S) and one of the recording points (C) on the normal to the grating ($R_1$) having $n=\sin\delta/\lambda_o$ lines/mm, $\lambda_o$ being the recording wavelength of the hologram and being such that the said one of the recording points (C) is at a distance $r_c$ from the top (O) of the grating of radius of curvature R and the source point (S) is at a distance r such that:

$$\frac{1}{r} = \frac{1+P}{R} - \frac{P}{r_c},$$

the locus of the images diffracted at the angle $\beta$ such that, if m is the diffraction order, $\sin\beta=mn\lambda$, with $$P = \frac{m\lambda}{\lambda},$$

being a circle ($P_1$) of radius $R/(2 \sin \delta) = R/(2 \cos \beta_o)$, centered on the diffracted ray corresponding to the direction $\sin \beta_o = \cos \delta$, and passing through the top (O) of the grating and its center of curvature, the second recording point (D) being defined in polar coordinates by $r_D$ and $\delta$ such that $\sin \delta = n\lambda_o$ and $$r_D = \frac{r'\lambda_o}{m\lambda},$$

$r'$ being the image distance characterized by any distance from the top of the grating to the circle ($P_1$).

3. A method as claimed in claim 2 and further including locating the recording point (C) on the normal to the grating at a distance:

$$r_c = \frac{r\lambda_o}{\lambda m}$$

from the top (O) of the grating of radius of curvature R, and locating the source point at a distance $$r = R\left(1 - \frac{m\lambda}{\lambda_o}\right)$$

from the top of the grating.

4. A method as claimed in claim 1 and applied to a dispersive lens, and further including the step of locating the locus of the object points (S) of the dispersive lens in a circle ($P'_1$) of radius $R/2|\sin \eta|) = R/(2 \cos \alpha_o)$, centered in the direction $\pm \sin \alpha_o = \cos \eta$ passing through the top of the grating (O) and its center of curvature (O'), $\alpha$ being the angle of incidence, any one of the object points (S) being at a distance $r = Re$ from the top of the grating, such that $r = R[\sin \alpha \cotan \eta + \cos \alpha]$, the recording point C being defined in polar coordinates by $\eta$ and its distance $r_c$ from the top of the grating, such that $r_c = -r/P$, with $P = m\lambda/\lambda_o$, m being the diffraction order and $\lambda_o$ being the recording wavelength of the hologram, such that $\sin \alpha = -P \sin \eta$, the locus of images diffracted at the angle $\beta$ such that $\sin \beta = P \sin \delta$ being a circle ($P_1$) of radius $R/(2 \sin \delta) = R/(2 \cos \beta)$, centered on the diffracted ray corresponding to the direction $\sin \beta_o = \cos \delta$, and passing through the top (O) of the grating and its center of curvature, any one of the image points (B) being at a distance $r' = Re'$ from the top of the grating, such that $r' = R \sin \beta \cotan \delta + \cos \beta$], the second recording point (D) being defined by $P \sin \delta = \sin \beta$ and by its distance $r_D$ from the top of the grating, such that $r_D = r'/P$.

5. A method as claimed in claims 3 or 4 and further including the step of mounting a stigmatic polychromator so that the tangential and focal lines are identical and so that for the wavelengths $$\lambda^x - \Delta\lambda < \lambda^x < \lambda^x + \Delta\lambda$$

wherein the direction of the diffracted ray corresponding to the wavelength $\lambda^x$ corresponds to the formula: $mn\lambda^x = \sin \beta^x = \cos \beta = 0.6077$, and in which the focusing locusing locus is a plane (P,) forming an angle of about 73.8° with the direction of the diffracted ray, the image distance for the wavelength $\lambda^x$ having the value $r' = R \cos \beta^{x-1} = R \sin \delta^{-1} \simeq 1.26R$.

6. A method as claimed in claims 3 or 4 and further including the step of mounting a stigmatic polychromator so that the tangential and focal lines are identical and so that for the wavelengths $$\lambda^x - \Delta\lambda < \lambda^x < \lambda^x + \Delta\lambda,$$

wherein the direction of the diffractive ray corresponding to the wavelength $\lambda^x$ corresponds to the formula $mn\lambda^x = \sin \beta^x$, with $\tan \beta^x = \sin \delta(\sin \delta + \cos \delta)$, with $\delta > 45°$, the focusing locus being a circle centered on the center (O'') of the Rowland circle (R) and of radius $$R_c = \frac{R}{2}\left(\frac{\sin \delta + \cos \delta}{\sin \delta}\right).$$

7. A method as claimed in claims 3 or 4 and further including the step of selecting a stigmatic dispersive lens for the far ultraviolet, working in the negative orders, wherein the object is located on the normal to the grating, the direction of observation corresponding to an angle of diffraction $\beta$ of less than 45°, one of the recording points (C) being located on the normal to the grating and the second being located in the direction $\delta$ such that $\delta + \beta = \epsilon$, $\epsilon$ being a positive quantity which is very small compared with $\delta$ and $\beta$.

8. A method as claimed in claim 1 and further including the step of selecting a dispersive collimator and locating the object at infinity of the normal to the grating, and wherein the observation wavelength $\lambda$ corresponding to the diffraction angle $\beta$ such that: $\sin \beta = P \sin \delta$, with $P = m\lambda/\lambda_o$, is observed on the circle $P_1$ of radius $R/(2 \sin \delta)$, and wherein one of the recording points C is located on the normal to the grating at a distance of $r_c = RP/(P+1)$.

9. A method as claimed in claim 1, and further including the step of locating the source point (S) and the image point (S') on a circle ($P_2$) whose radius (aR) is centered at ($\overline{O}$) on the tangent to the top (O) of the grating, and which passes through the top (O) of the grating, the said grating being a holographic grating such that, if $\lambda_o$ is the wavelength of the laser used for recording and n is the number of lines per mm, such that $n\lambda_o = \sin \delta - \sin \eta$, the hologram is produced from two source points C($\eta$, $r_c$) and D($\delta$, $r_D$), the position of which is defined in polar coordinates, and is such that $r_{ci} = aR \sin \eta$ and $r_D = aR \sin \delta$, a being a number which can be any integer or fraction different from 0.

10. The method as claimed in claim 9, and further including the step of positioning a toroidal mirror relative to the reflective grating, working at a magnification of 1, so as to give an image (S'$_1$) of the source point (S), the image being located on the circle ($P_2$) whose radius is centered on the tangent to the top of the graing, and which passes through the top of the grating, and the said image (S$_1$) acting as a virtual object for the grating (R), which gives a stigmatic real image thereof located on the circle ($P_2$).

11. A method as claimed in claim 1, and further including the step of selecting a dispersive lens such that for a beam coming from infinity at an angle $\alpha$ such that $\sin \alpha = P \sin \delta$, with $T = m\lambda/\lambda_o$, m being the interference order and $\lambda_o$ being the recording wavelength of the hologram, the diffracted image forms at the center of curvature of the grating, the recording points of the hologram, $C[\eta, r_c = \infty]$ and $D[\delta, r_D = \infty]$, being angularly positioned, relative to the normal to the grating, in such a way that: $\delta + \eta = 2\alpha + \pi$.

12. A method as claimed in claim 1, and further including the step of selecting a dispersive lens such that for an incident beam coming from infinity at an angle $\alpha$ such that $\sin \alpha = P \sin \delta$, with $P = m\lambda/\lambda_o$, m being the interference order and $\lambda_o$ being the recording wavelength, the image forms at a distance $r' = R \sin \delta[\sin \delta + \sin (\delta - \alpha)]^{-1}$, one of the recording points, C, being at the center of curvature and the other, D, being at infinity, inclined at an angle $\delta$ relative to the normal to the grating.

13. A method as claimed in claim 1, and further including the step of selecting a dispersive lens such that for an incident beam coming from infinity at an angle $\alpha$ and a beam diffracted to infinity at an angle $\beta$, the angle between the said beams at the top of the said lens is $\alpha - \beta = 2\theta$, such that $m\lambda = 2\lambda_o \cos \theta$, m being the diffraction order and $\lambda_o$ being the recording wavelength of the hologram, one of the source points (C) being at the center of curvature of the said lens and the other (D) being at infinity, inclined at an angle $\delta$ relative to the normal to the said lens, this angle being equal to that formed by the normal to the lens and the bisector of the angle $2\theta$.

* * * * *